(12) United States Patent
Gurvich et al.

(10) Patent No.: US 10,676,319 B2
(45) Date of Patent: Jun. 9, 2020

(54) ELEVATOR TENSION MEMBER

(71) Applicant: OTIS ELEVATOR COMPANY, Farmington, CT (US)

(72) Inventors: Mark R. Gurvich, Middletown, CT (US); Wenping Zhao, Glastonbury, CT (US); John P. Wesson, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/259,566

(22) Filed: Sep. 8, 2016

(65) Prior Publication Data

US 2017/0066630 A1    Mar. 9, 2017

Related U.S. Application Data

(60) Provisional application No. 62/215,390, filed on Sep. 8, 2015.

(51) Int. Cl.
*B66B 7/06* (2006.01)
*B29C 70/30* (2006.01)
(Continued)

(52) U.S. Cl.
CPC .............. *B66B 7/062* (2013.01); *B29C 70/12* (2013.01); *B29C 70/16* (2013.01); *B29C 70/30* (2013.01);
(Continued)

(58) Field of Classification Search
CPC ... B66B 7/062; F16G 1/08; F16G 5/06; B29C 70/30; B29K 2105/06
See application file for complete search history.

(56) References Cited

U.S. PATENT DOCUMENTS 3,716,614 A * 2/1973 Okamoto .............. B29C 47/128
156/155
4,012,962 A * 3/1977 Ballou ................... B29D 29/10
156/139
(Continued)

FOREIGN PATENT DOCUMENTS

CN    201678338 U    12/2010
CN    202030973 U    11/2011
(Continued)

OTHER PUBLICATIONS

European Search Report and Written Opinion; International Application No. EP16187690.9; International Filing Date: Sep. 7, 2016; dated Feb. 3, 2017; 14 pages.

*Primary Examiner* — Minh Truong
(74) *Attorney, Agent, or Firm* — Cantor Colburn LLP

(57) ABSTRACT

A belt for suspending and/or driving an elevator car includes a tension member extending along a length of the belt, the tension member including a plurality of fibers bonded in a first polymer matrix, the plurality of fibers extending parallel to and discontinuous along a length of the belt and arranged with one or more lengthwise extending gaps between lengthwise adjacent fibers. A jacket substantially retains the tension member. A method of forming a tension member for an elevator system belt includes arranging a plurality of fibers into a fiber bundle. The plurality of fibers extend parallel to a length of the belt and have one or more lengthwise extending gaps between lengthwise extending fibers. The plurality of fibers is bonded to a first polymer matrix.

12 Claims, 7 Drawing Sheets

(51) Int. Cl.
*B29C 70/12* (2006.01)
*B29C 70/16* (2006.01)
*D07B 5/08* (2006.01)
*D07B 7/14* (2006.01)
*B29K 105/08* (2006.01)
*B29K 105/12* (2006.01)
*D07B 1/22* (2006.01)
*B29D 29/00* (2006.01)

(52) U.S. Cl.
CPC ............... *D07B 5/08* (2013.01); *D07B 7/145* (2013.01); *B29D 29/00* (2013.01); *B29K 2105/08* (2013.01); *B29K 2105/12* (2013.01); *B29K 2995/0077* (2013.01); *D07B 1/22* (2013.01); *D07B 2201/2002* (2013.01); *D07B 2201/2007* (2013.01); *D07B 2201/2033* (2013.01); *D07B 2201/2046* (2013.01); *D07B 2205/205* (2013.01); *D07B 2205/2007* (2013.01); *D07B 2205/2039* (2013.01); *D07B 2205/2046* (2013.01); *D07B 2205/3003* (2013.01); *D07B 2205/3007* (2013.01); *D07B 2501/2007* (2013.01)

(56) References Cited

U.S. PATENT DOCUMENTS

| | | |
|---|---|---|
| 4,557,680 A | 12/1985 | Standley |
| 4,657,526 A * | 4/1987 | Tangorra ............... F16G 5/20 474/261 |
| 4,806,299 A * | 2/1989 | Burns ............... D01F 1/10 264/172.13 |
| 6,410,126 B1 | 6/2002 | Guevel et al. |
| 6,684,981 B2 | 2/2004 | Stucky et al. |
| 7,828,121 B2 * | 11/2010 | Parrini ............... D07B 1/02 187/251 |
| 8,252,411 B2 | 8/2012 | Veronesi et al. |
| 8,910,462 B2 | 12/2014 | De Smet et al. |
| 2002/0039947 A1 * | 4/2002 | Hasaka ............... F16G 1/06 474/263 |
| 2005/0257874 A1 | 11/2005 | Soenen et al. |
| 2008/0067010 A1 | 3/2008 | Ach |
| 2010/0140022 A1 | 6/2010 | Ach |
| 2011/0259677 A1 * | 10/2011 | Dudde ............... B66B 7/062 187/411 |
| 2014/0066244 A1 * | 3/2014 | Furukawa ............... F16G 5/20 474/263 |
| 2014/0076669 A1 | 3/2014 | Wesson et al. |
| 2014/0305744 A1 | 10/2014 | Kere et al. |
| 2015/0101888 A1 | 4/2015 | Pelto-Huikko et al. |

FOREIGN PATENT DOCUMENTS

| | | |
|---|---|---|
| CN | 202543706 U | 11/2012 |
| CN | 203187270 U | 9/2013 |
| CN | 203268862 U | 11/2013 |
| CN | 203402596 U | 1/2014 |
| CN | 203976193 U | 12/2014 |
| CN | 203977213 U | 12/2014 |
| CN | 104495587 A | 4/2015 |
| CN | 104495588 A | 4/2015 |
| CN | 204355905 U | 5/2015 |
| CN | 204355906 U | 5/2015 |
| DE | 102010042357 A1 | 4/2012 |
| EP | 1428927 A1 | 6/2004 |
| EP | 1561719 A1 | 8/2005 |
| EP | 2894119 A1 | 7/2015 |
| WO | 2009090299 A1 | 7/2009 |
| WO | 2009090299 A8 | 7/2010 |
| WO | 2013016944 A1 | 2/2013 |

* cited by examiner

ELEVATOR TENSION MEMBER

CROSS-REFERENCE TO RELATED APPLICATIONS

This application claims the benefit of U.S. Provisional Application Ser. No. 62/215,390, entitled "Elevator Tension Member", filed Sep. 8, 2015, under 35 U.S.C. § 119(e), and which is incorporated herein by reference in its entirety.

BACKGROUND OF THE INVENTION

The subject matter disclosed herein relates to tension members such as those used in elevator systems for suspension and/or driving of the elevator car and/or counterweight.

Traction-driven elevator belts are typically constructed using tension members, such as steel cords. More recent developments in the area of composites include the use of continuous synthetic fibers such as carbon fiber, glass fiber and/or organic aramid or polyimide fiber to provide a greater strength to weight ratio than steel. Although a belt with continuous carbon fiber and thermoset resin will provide improved strength to weight advantages compared to steel cord belt, significant performance and durability challenges exist. For example, the rigid construction is contrary to the desire for a flexible belt capable of many thousands of bending cycles without brittle or fatigue failure in the field.

BRIEF SUMMARY

In one embodiment, a belt for suspending and/or driving an elevator car includes a tension member extending along a length of the belt, the tension member including a plurality of fibers bonded in a first polymer matrix, the plurality of fibers extending parallel to and discontinuous along a length of the belt and arranged with one or more lengthwise extending gaps between lengthwise adjacent fibers. A jacket substantially retains the tension member.

Additionally or alternatively, in this or other embodiments the tension member further includes a plurality of fiber bundles secured to one another via a second polymer matrix, each fiber bundle including a plurality of fibers bonded in the first polymer matrix.

Additionally or alternatively, in this or other embodiments the second polymer matrix material is different from the first polymer matrix material.

Additionally or alternatively, in this or other embodiments the tension member has a fiber density by volume of between 30% and 70%.

Additionally or alternatively, in this or other embodiments the fiber bundle includes fibers of non-uniform cross-sectional sizes and/or lengths.

Additionally or alternatively, in this or other embodiments the belt includes one or more layers of fibers extending nonparallel to the length of the belt.

Additionally or alternatively, in this or other embodiments the one or more layers are disposed at an outermost belt surface.

Additionally or alternatively, in this or other embodiments the plurality of fibers are formed from one or more of carbon, glass, polyester, nylon, aramid or other polyimide materials.

Additionally or alternatively, in this or other embodiments the first polymer matrix is formed from a thermoset material or a thermoplastic material Additionally or alternatively, in this or other embodiments the belt has an aspect ratio of belt width to belt thickness of greater than or equal to 3:2, with a plurality of tension members arranged across the belt width.

In another embodiment, an elevator system includes an elevator car, one or more sheaves and one or more belts operably connected to the car and interactive with the one or more sheaves for suspending and/or driving the elevator car. Each belt of the one or more belts includes a tension member extending along a length of the belt, the tension member including a plurality of fibers bonded in a first polymer matrix. The plurality of fibers extend parallel to and are discontinuous along a length of the belt and arranged with one or more lengthwise extending gaps between lengthwise adjacent fibers. A jacket substantially retains the tension member.

Additionally or alternatively, in this or other embodiments the tension member further comprises a plurality of fiber bundles secured to one another via a second polymer matrix, each fiber bundle including a plurality of fibers bonded in the first polymer matrix.

Additionally or alternatively, in this or other embodiments the second polymer matrix material is different from the first polymer matrix material.

Additionally or alternatively, in this or other embodiments the tension member has a fiber density by volume of between 30% and 70%.

Additionally or alternatively, in this or other embodiments the fiber bundle includes fibers of non-uniform cross-sectional sizes and/or lengths.

Additionally or alternatively, in this or other embodiments the belt includes one or more layers of fibers extending nonparallel to the length of the belt.

Additionally or alternatively, in this or other embodiments the one or more layers are disposed at an outermost belt surface.

Additionally or alternatively, in this or other embodiments the plurality of fibers are formed from one or more of carbon, glass, polyester, nylon, aramid or other polyimide materials.

Additionally or alternatively, in this or other embodiments the first polymer matrix is formed from a thermoset material or thermoplastic material.

Additionally or alternatively, in this or other embodiments the belt has an aspect ratio of belt width to belt thickness of greater than or equal to 3:2, with the plurality of tension members arranged across the belt width.

In yet another embodiment, a method of forming a tension member for an elevator system belt includes arranging a plurality of fibers into a fiber bundle. The plurality of fibers extend parallel to a length of the belt and have one or more lengthwise extending gaps between lengthwise extending fibers. The plurality of fibers is bonded to a first polymer matrix.

Additionally or alternatively, in this or other embodiments the one or more lengthwise extending gaps are formed by breaking lengthwise adjacent fibers.

Additionally or alternatively, in this or other embodiments the plurality of fibers are formed from one or more of carbon, glass, polyester, nylon, aramid or other polyimide materials

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1A:
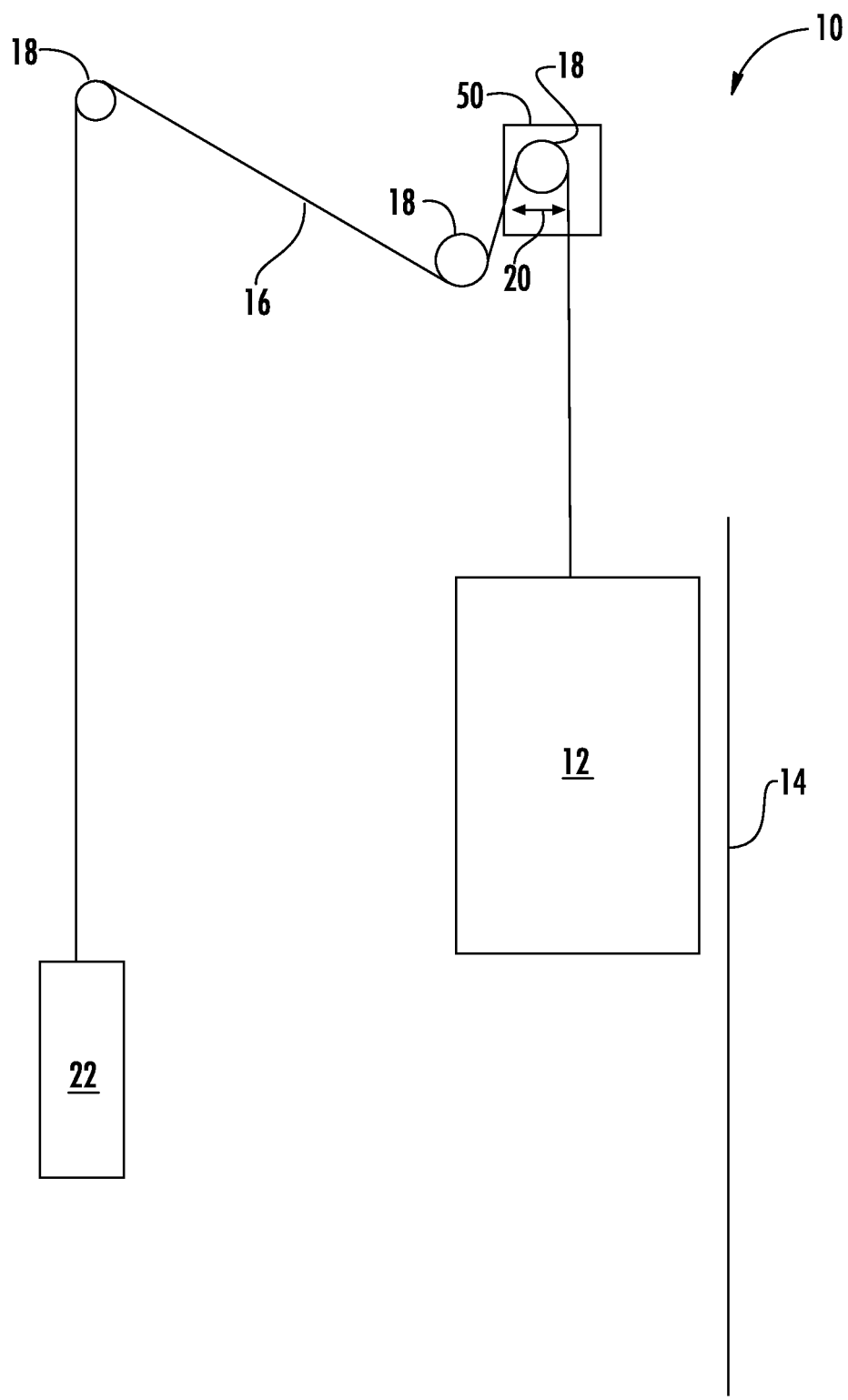
FIG. 1A is a schematic of an exemplary elevator system having a 1:1 roping arrangement.
Figure 1B:
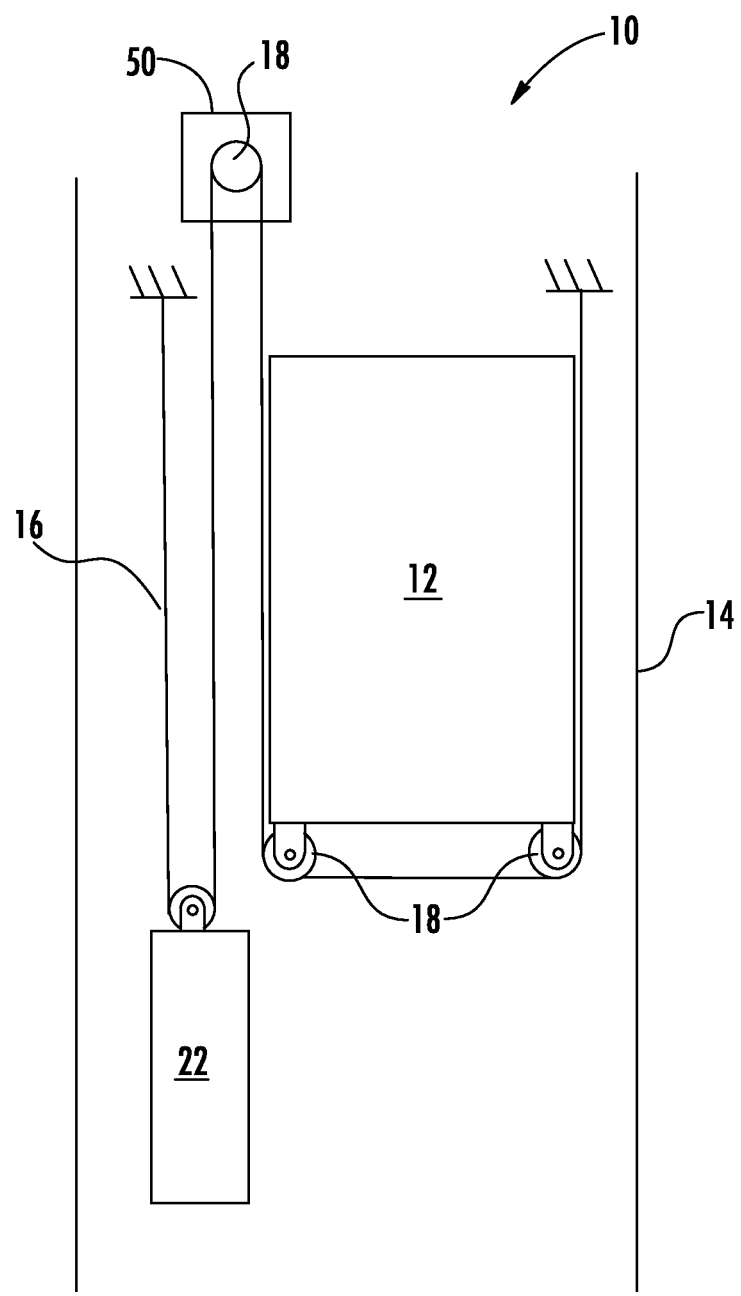
FIG. 1B is a schematic of another exemplary elevator system having a different roping arrangement.
Figure 1C:
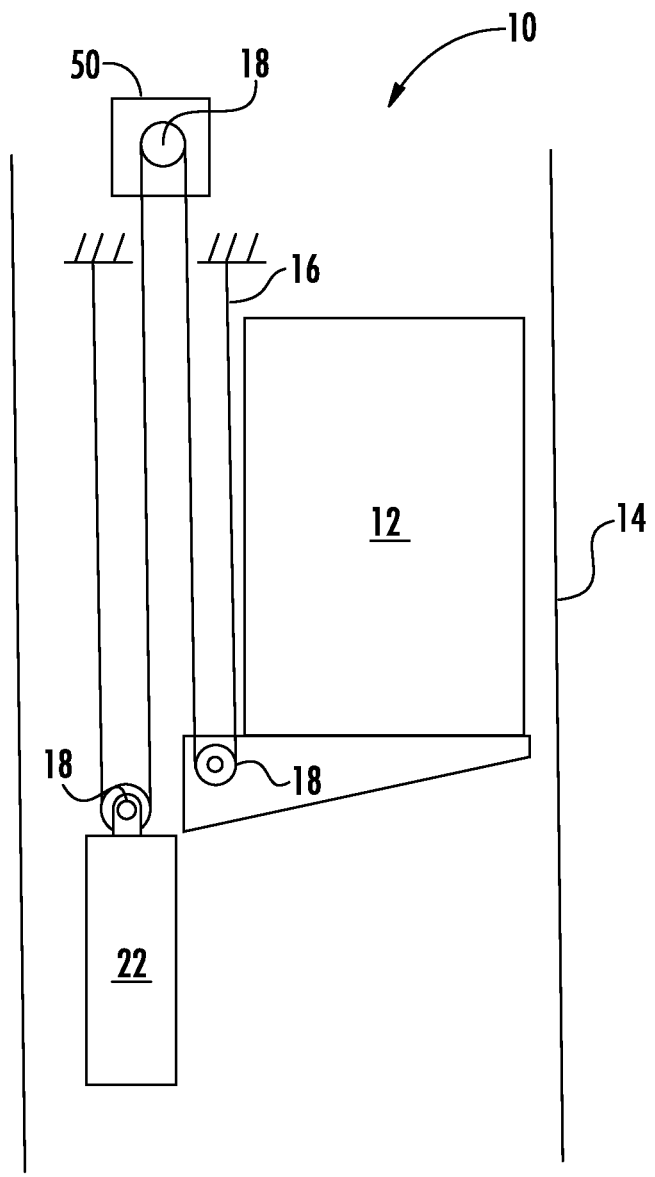
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves 18 could be a drive sheave. A drive sheave is driven by a machine 50. Movement of drive sheave by the machine 50 drives, moves and/or propels (through traction) the one or more belts 16 that are routed around the drive sheave.

At least one of the sheaves 18 could be a diverter, deflector or idler sheave. Diverter, deflector or idler sheaves are not driven by the machine 50, but help guide the one or more belts 16 around the various components of the elevator system 10.

In many embodiments, the elevator system 10 may utilize a multiplicity of belts 16 for suspending and/or driving the elevator car 12. In addition, the elevator system 10 could have various configurations such that either both sides of the one or more belts 16 engage the one or more sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more belts 16 and the one or more belts 16 terminate elsewhere, typically at a pair of load carrying structures within the hoistway 14 (such as for a machineroomless elevator system) or within the machine room (for elevator systems utilizing a machine room. The number of sheaves 18 used in the arrangement determines the specific roping ratio (e.g. the 2:1 roping ratio shown in FIGS. 1B and 1C or a different ratio). FIG. 1C also provides a so-called rucksack or cantilevered type elevator. The present invention could be used on elevator systems other than the exemplary types shown in FIGS. 1A, 1B and 1C.

Figure 2:
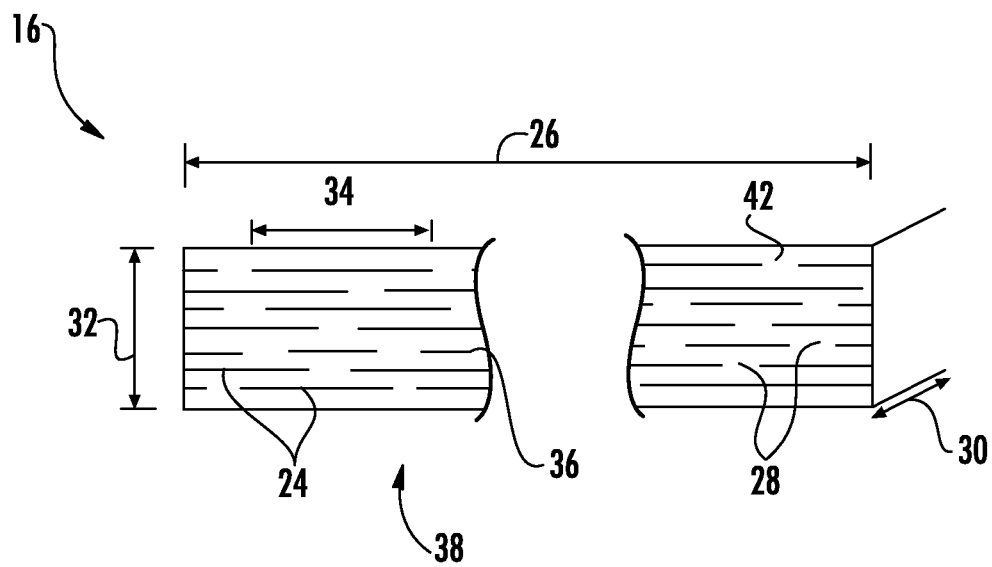
FIG. 2 is a lengthwise cross-sectional view of an embodiment of an elevator belt for an elevator system.
Figure 3:
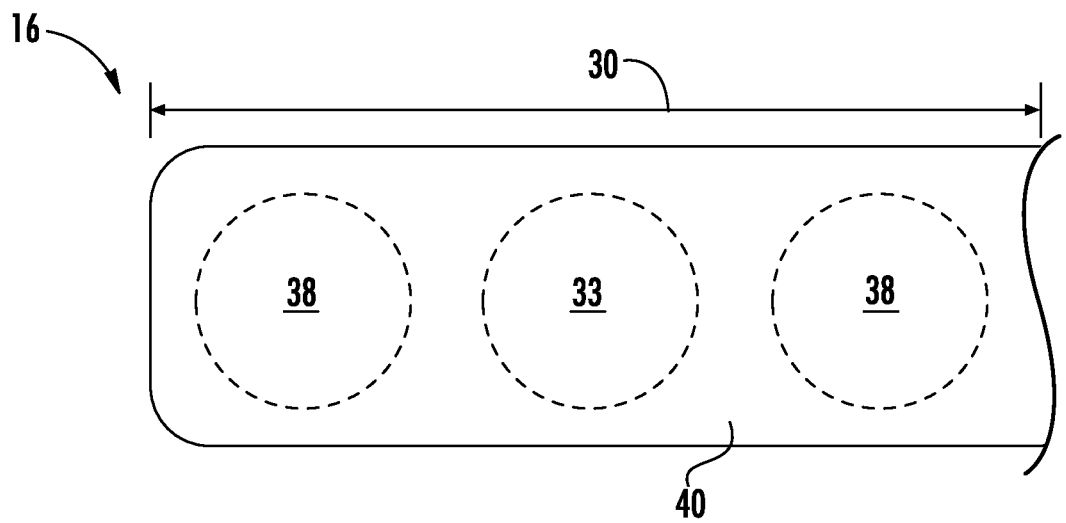
FIG. 3 is a width-wise cross-sectional view of an embodiment of an elevator belt for an elevator system.

FIG. 2 provides a schematic lengthwise cross-sectional view of an exemplary belt 16 construction or design. The belt 16 includes a plurality of fibers 24. The fibers 24 are discontinuous over a belt length 26, having a number of breaks or gaps 28 between fibers 24 along the belt length 26. The plurality of fibers 24 may be arranged or stacked along a belt width 30 and/or a belt thickness 32, oriented generally such that a fiber length 34 is directed along the belt length 26. The fibers 24 are bonding to a polymer matrix 36 to form a tension member 38 for the belt 16. One or more such tension members 38 may be encased in a polymer jacket 40 to form the belt 16. For example, in the embodiment shown in FIG. 3, the belt 16 includes three tension members 38 encased in the jacket 40.

The fibers 24 may be formed of one or more of a number of materials, such as carbon, glass, polyester, nylon, aramid or other polyimide materials. Further, the fibers 24 may be organized into a grouping, such as a spun yarn. The matrix 36 may be formed of, for example a thermoset or thermoplastic material, while the jacket 40 may be formed from an elastomer material, such as thermoplastic polyurethane (TPU). The tension member 38 is further configured to have a fiber 24 density of 30% to 70% fibers 24 per unit of volume. In some embodiments, the fibers 24 may vary in size, length or circumference and may further be intentionally varied to provide a selected maximum fiber 24 density Referring again to FIG. 2, when the fibers 24 are arranged, the fibers 24 are staggered such that a gap 28 does not extend continuously through an entire belt thickness 32 or an entire belt width 30, so the belt retains a required lengthwise strength even though the fibers 24 are discontinuous along the belt length 26. Further, the belt 16 with discontinuous fibers 24 has reduced bending stiffness along the lengthwise direction resulting in improved belt flexibility, and improved damping properties compared to a belt with continuous fibers. Damping is improved via stress concentrations at the numerous fiber ends 42 and, therefore, increased hysteretic energy losses at the gaps 28 and areas between the fibers 24. The improved damping properties improve the elevator ride comfort, especially for high rise installations.

Figure 4:
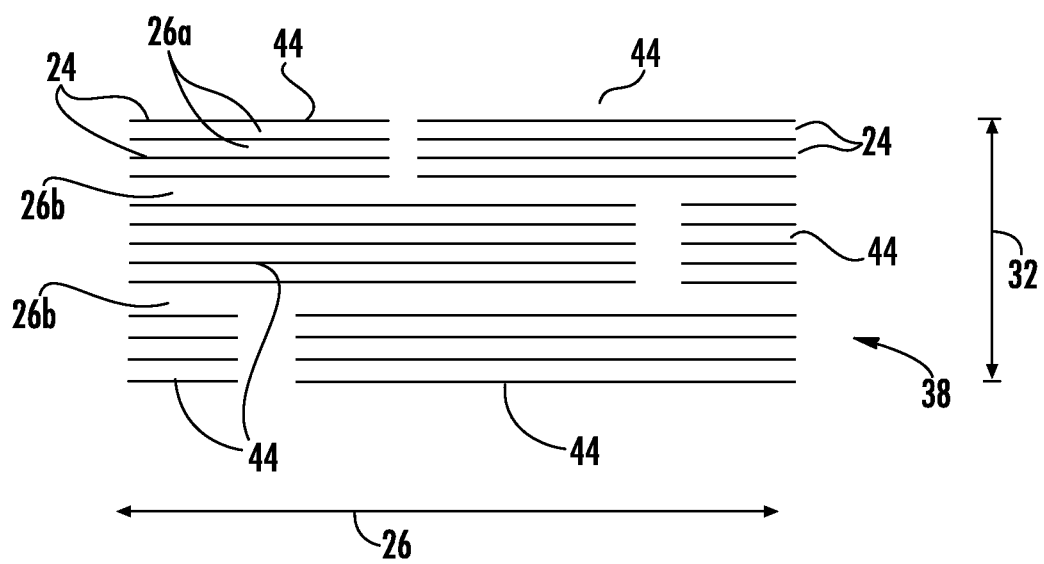
FIG. 4 is a lengthwise cross-sectional view of another embodiment of an elevator belt for an elevator system.
Figure 5:
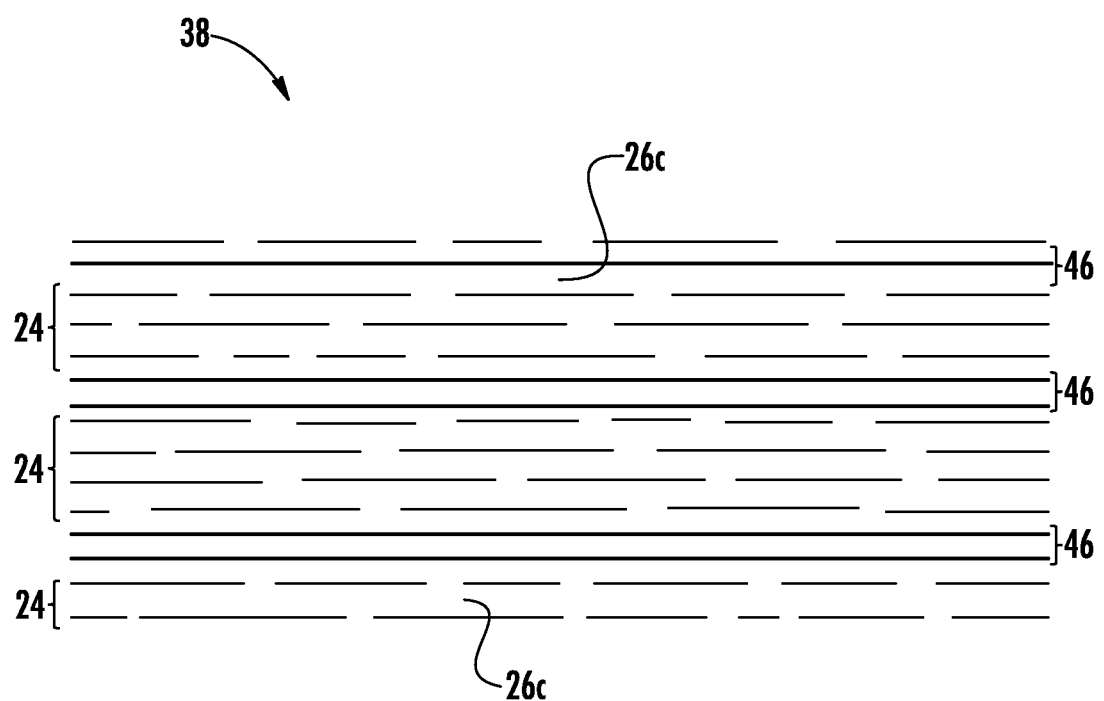
FIG. 5 is a lengthwise cross-sectional view of yet another embodiment of an elevator belt for an elevator system.

Another embodiment is shown in FIG. 4. In this embodiment, the fibers 24 are arranged into bundles 44 including multiple layers of fibers 24. The bundles 44 may be arranged or stacked along the belt length 26 or along the belt width 30 or along the belt thickness 32. The bundles 44 are formed by bonding fibers 24 with a first polymer matrix 26a. The bundles 44 may then be formed into the tension member 38 by arranging the bundles 44 into a selected configuration, then bonding the bundles 44 into the tension member 38 with a second polymer matrix 26b. In some embodiments, the first polymer matrix 26a is the same material as the second polymer matrix 26b, while in other embodiments the first polymer matrix 26a and the second polymer matrix 26b are of different materials to achieve a selected performance of the tension member 38. In other embodiments, as shown in FIG. 5, non-continuous fibers 24 may be combined with a plurality of continuous fibers 46 to form a hybrid tension member 38.

In some embodiments, the fibers 24 are discontinuous when bonded with the first polymer matrix 26, while in other embodiments continuous fibers fed into the production machinery and after matrix impregnation and/or partial curing (cooling), the fibers are then broken into short fibers 24 before the final cure (or solidification).

Figure 6:
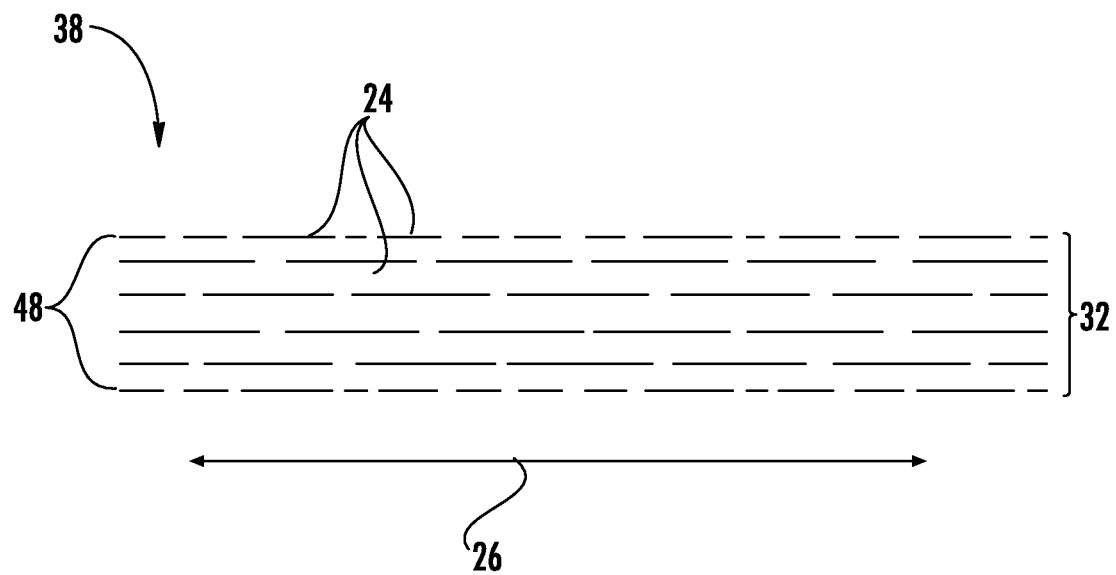
FIG. 6 is a lengthwise cross-sectional view of an embodiment of a tension member for an elevator belt for an elevator system.
Figure 7:
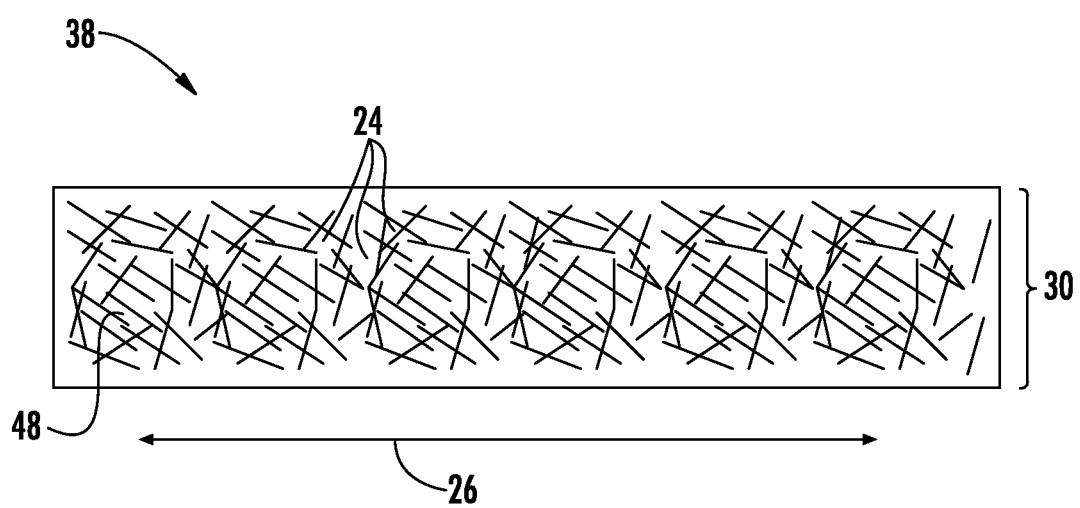
FIG. 7 is a plan view of an embodiment of a tension member for an elevator belt for an elevator system.

Referring now to FIGS. 6 and 7, the belt 16, or tension member 38, may include one or more layers 48 of randomly-oriented fibers 24, with at least a portion of the fibers oriented in a direction other than along the belt length 26. The random or off-length orientation of the fibers 24 increases a belt strength across the belt width 30. The layers 48 may be the outermost portions of the tension member 38 as shown in FIG. 6, or alternatively one or more layers 48 may be embedded in an interior of the tension member 38. Further, the fibers 24 of the layers 48 may be formed from a same material as the fibers 24 of the remainder of the tension member 38, or may be formed from a different material. The layers 48 can be either continuous or discontinuous or combination of both.

In addition to the aforementioned reduced bending stiffness leading to greater belt flexibility, and also in addition to the better damping performance of the belt 16 with discontinuous fibers 24, the belt 16 has improved reparability as it is not necessary to retain fiber continuity when making the repair.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A belt for suspending and/or driving an elevator car, comprising:
a plurality of tension members extending along a length of the belt, each tension member of the plurality of tension members including a plurality of fiber bundles stacked in a belt thickness direction, each fiber bundle of the plurality of fiber bundles including a plurality of fibers extending parallel to and discontinuous along a length of the belt and bonded in a first polymer matrix, the plurality of discontinuous fibers of each fiber bundle are aligned with each other at least at one length end of the fiber bundle, the plurality of fiber bundles arranged with one or more lengthwise extending fiber gaps between lengthwise adjacent fibers and one or more lengthwise extending bundle gaps, relative to the length of the belt, between adjacent fiber bundles of the plurality of fiber bundles and a thickness-wise gap between thickness-wise adjacent layers of fiber bundles of the plurality of fiber bundles, relative to the belt thickness direction, adjacent fiber bundles of the plurality of fiber bundles secured to one another at the lengthwise gap and the thickness-wise gap by a second polymer matrix; and
a jacket substantially retaining the plurality of tension members;
wherein a first lengthwise bundle gap at a first thickness-wise layer of fiber bundles of the plurality of fiber bundles is offset in the lengthwise direction from a second lengthwise bundle gap at a second thickness-wise layer of fiber bundles of the plurality of fiber bundles; and
wherein at least one fiber bundle of the plurality of fiber bundles includes fibers of non-uniform sizes.

2. The belt of claim 1, wherein the second polymer matrix material is different from the first polymer matrix material.

3. The belt of claim 1, wherein the tension member has a fiber density by volume of between 30% and 70%.

4. The belt of claim 1, wherein the plurality of fibers are formed from one or more of polyester, nylon, aramid or other polyimide materials.

5. The belt of claim 1, wherein the first polymer matrix is formed from a thermoset material or a thermoplastic material.

6. The belt of claim 1, wherein the belt has an aspect ratio of belt width to belt thickness of greater than or equal to 3:2, with a plurality of tension members arranged across the belt width.

7. An elevator system comprising:
an elevator car;
one or more sheaves; and
one or more belts operably connected to the car and interactive with the one or more sheaves for suspending and/or driving the elevator car, each belt of the one or more belts including a plurality of tension members extending along a length of the belt, each tension member of the plurality of tension members including a plurality of fiber bundles stacked in a belt thickness direction, each fiber bundle of the plurality of fiber bundles including a plurality of fibers extending parallel to and discontinuous along a length of the belt and bonded in a first polymer matrix, the plurality of discontinuous fibers of each fiber bundle are aligned with each other at least at one length end of the fiber bundle, the plurality of fiber bundles arranged with one or more lengthwise extending fiber gaps between lengthwise adjacent fibers and one or more lengthwise extending bundle gaps, relative to the length of the belt, between adjacent fiber bundles of the plurality of fiber bundles and a thickness-wise gap between thickness-wise adjacent layers of fiber bundles of the plurality of fiber bundles, relative to the belt thickness direction, adjacent fiber bundles of the plurality of fiber bundles secured to one another at the lengthwise gap and the thickness-wise gap by a second polymer matrix; and
a jacket substantially retaining the plurality of tension members;
wherein a first lengthwise bundle gap at a first thickness-wise layer of fiber bundles of the plurality of fiber bundles is offset in the lengthwise direction from a second lengthwise bundle gap at a second thickness-wise layer of fiber bundles of the plurality of fiber bundles; and
wherein at least one fiber bundle of the plurality of fiber bundles includes fibers of non-uniform sizes.

8. The elevator system of claim 7, wherein the second polymer matrix material is different from the first polymer matrix material.

9. The elevator system of claim 7, wherein the tension member has a fiber density by volume of between 30% and 70%.

10. The elevator system of claim 7, wherein the plurality of fibers are formed from one or more of polyester, nylon, aramid or other polyimide materials.

11. The elevator system of claim 7, wherein the first polymer matrix is formed from a thermoset material or thermoplastic material.

12. The elevator system of claim 7, wherein the belt has an aspect ratio of belt width to belt thickness of greater than or equal to 3:2, with the plurality of tension members arranged across the belt width.

\* \* \* \* \*